April 21, 1964    R. D. NEALLEY    3,129,721
CHECK VALVE
Filed June 6, 1961

INVENTOR.
ROY D. NEALLEY
BY
Kenway, Jenney & Hildreth
ATTORNEYS

United States Patent Office 3,129,721
Patented Apr. 21, 1964

3,129,721
CHECK VALVE
Roy D. Nealley, Lark, Utah, assignor to United States Smelting, Refining and Mining Company, Boston, Mass., a corporation of Maine
Filed June 6, 1961, Ser. No. 115,251
12 Claims. (Cl. 137—516.11)

This invention relates generally to valves for controlling the flow of fluids and in particular it is concerned with check valves incorporating deformable membranes.

Valves incorporating deformable membranes, for example a rubber sleeve, are well known and are readily obtainable commercially. In a check valve, the membrane is usually adapted to provide a fluid tight seal absent a positive fluid pressure differential and to expand under the influence of a positive pressure until the seal is destroyed. This opens the valve to the forward flow of fluid.

It is a common practice to use check valves in lines through which a liquid is being pumped to a higher level so that back flow of the liquid will be prevented when pumping is terminated. For example, it is frequently necessary to pump water to the surface from underground mines in order to keep the mines from flooding. A vertical lift of hundreds of feet at the rate of several thousand gallons a minute is not uncommon in this kind of pumping operation wherein relatively large diameter lines are a necessity. Because of the large volume of water present in the lines, and the high back pressure thereof, it follows that the possibility of a sudden back rush of water from the lines is a matter of serious concern.

In this kind of environment, it has been found that deformable membranes in check valves of conventional design do not last more than a few months. Since the membranes are usually expensive to manufacture and difficult to replace, this leads to high maintenance costs. Furthermore, it is not always convenient to take a valve out of service for repair when it begins to show signs of failure.

The primary object of the present invention therefore is to obviate the foregoing difficulty encountered with conventional check valves incorporating deformable membranes.

A concomitant object is to provide a check valve which is extremely simple to fabricate and to assemble.

Another object is to provide a check valve which is highly reliable in operation and capable of withstanding relatively high back pressures.

In brief, the check valve of my invention features a perforate cage of generally cylindrical configuration which is disposed in axial alignment with the direction of flow through the valve chamber. Inside this cage is another cage which is shaped in the manner of a fluted column with its outer surface parallel and adjacent to the cylindrical inner surface of the outer cage. The membrane consists of a member of rubber or other deformable material which is clamped between the inner and outer cages and which is adapted to assume the cylindrical contour of the outer cage in the absence of a positive fluid pressure differential between the inlet and outlet of the valve. When a back pressure exists, the membrane is adapted to press all the harder against the wall of the outer cage, but when a positive pressure differential exists then the membrane is urged radially inwardly against the convoluted outer wall of the inner cage permitting fluid to flow between the cages in a forward direction. The circumferential dimension of the next adjacent walls of the inner and outer cages are made substantially equal to one another so that the rubber is not stretched significantly as it is moved between its valve open and valve closed position. This minimizes wear and fatigue of the rubber valve member and eliminates wrinkling of the valve member in either its open or closed position. Also, this construction has the advantage that a full open condition can be created with a relatively small pressure differential and under this condition there is very little obstruction to the flow of fluid through the valve. The result is less turbulence in the valve chamber and smoother pump operation. Another advantage resides in the fact that the valve closes very quickly so that water hammer is not a problem in most applications.

The novel features of the invention together with further objects and advantages will become apparent from the following detailed description and the drawing to which it refers. In the drawing.

Figure 1:
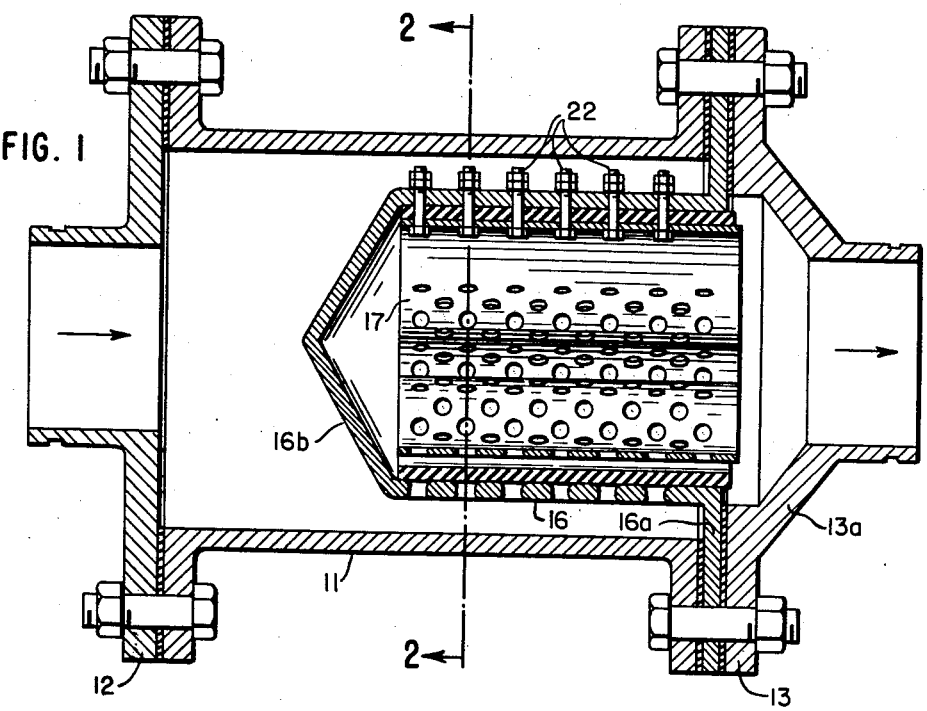
FIG. 1 is a sectional view of the valve according to the present invention.

With reference now to the drawing it will be observed that the numeral 11 designates the valve housing which is generally cylindrical and has radially outwardly directed flanges at either end. A coupling 12 is bolted to the inlet end of the valve body toward the left of the drawing and a coupling 13 is bolted to the outlet end. The outlet coupling is seen to have a tapered portion 13a so that the transition between the flow path in the valve body and the orifice at the outlet will be a more gradual one. This will appear more clearly as the description of the interior of the valve and the nature of the flow path therein proceeds.

Disposed in the chamber defined by the housing is a generally cylindrical cage 16 which is axially aligned with the orifices of the couplings; that is, coaxial with the chamber itself. The outer cage 16 is spaced radially inwardly of the inner wall of the housing 11 to provide a flow path between the inner wall of the housing and the outer cage. The outer cage 16 has a radially outwardly directed flange portion 16a at its end next adjacent the outlet coupling 13. To maintain the outer cage in assembly with the valve body, the flange 16a is clamped between the rear flange on the valve housing and the flange on the outlet coupling 13. Suitable gasket members are provided between these flanges as well as between the flanges at the inlet end of the valve body, as shown.

As can be seen in FIG. 1, the inlet end of the outer cage terminates short of the corresponding end of the valve body and this end of the cage is provided with an imperforate closure in the form of a conical member 16b. This external surface of the member 16b provides a more gradual transition of flow between the inlet orifice and the flow path between the outer cage and body.

The cylindrical wall of the outer cage 16 is provided with a large number of round holes the total area of which is substantially larger than the cross sectional area of either the inlet or outlet openings in the valve body. In a preferred embodiment, the total area of the holes in the outer cage is approximately 70% greater than the area of the inlet or outlet openings in the valve body.

Figure 2:
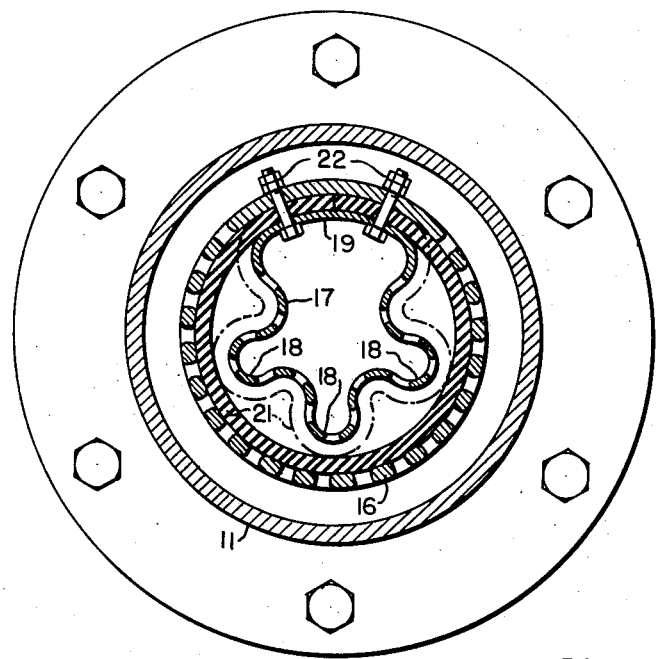
FIG. 2 is a sectional view taken on line 2—2 of FIG. 1.

Disposed within the outer cage 16 in radially inwardly spaced relation is a second or inner cage 17. The inner cage 17 is an elongated hollow member, the circumferential wall of which is irregularly contoured. More specifically, the wall of the inner cage 17 is convoluted so as to provide a plurality of lobes each extending parallel to the longitudinal axis of the cage. Each of the lobes extends the full length of the inner cage which is open at both ends. In the specific embodiment shown, the inner cage 17 comprises a plurality of similarly shaped lobes 18 and an enlarged or wider lobe 19. The wall of the inner cage 17 particularly in the areas of the lobes 18 and the portions of the wall connecting the lobes is perforated so as to provide a plurality of openings through the wall of the cage. The total area of the holes in the cage 17 is approximately equal to the total area of the holes in the wall of the other cage 16. As shown in FIG. 2, the inner cage is supported within the outer cage with the longitudinal axis of the inner cage extending parallel to the longitudinal axis of the outer cage. In the specific embodiment shown, the inner cage is supported by bolting the large lobe 19 of the inner cage to the wall of the outer cage. In accordance with one aspect of the invention, the circumferential dimension of the cylindrical inner surface of the outer cage is substantially equal to the circumferential dimension of the outer surface of the inner cage.

Disposed between the inner and outer cages is a deformable valve member 21 in the form of a generally cylindrical member fabricated from a material such as gum rubber or the like. In the specific embodiment, the valve member 21 is fabricated from an initially rectangular piece of material. A pair of the opposite edges of the rectangular sheet are brought together to form a cylinder which fits closely within the outer cage 16. The adjacent edges of the sheets of the sheet are brought together between the larger lobe 19 of the inner cage and the inner wall of the outer cage, and the bolts 22 serve to clamp the valve member between the inner and outer cages and, at the same time, support the inner cage on the outer cage. In accordance with another aspect of the invention, the valve member is dimensioned so that the portion thereof extending from the opposite sides of the lobe 19 of the inner cage, or in other words, the unclamped portion of the valve member, has a dimension circumferentially of the valve member which is substantially equal in length to the corresponding next adjacent surfaces of the inner and outer cages. Accordingly, the valve member may be moved between the full line and dotted line positions, shown in FIG. 2, without any significant stretching or compression of the material of the valve member and will assure that when the valve member is in its dotted line position it will conform to the irregular contour of the inner cage without any wrinkling of the valve member.

In the operation of the valve, when there is no differential pressure across the valve, the valve member will assume its full line position, shown in FIG. 2, wherein it conforms to the cylindrical inner surface of the outer cage. When a positive pressure differential exists across the valve, or in other words, when fluid enters through the inlet opening to the left of the valve, as shown in FIG. 1, the fluid will flow into the enlarged space between the inlet opening and closed end of the outer cage, and from there will flow into the annular passage between the outer cage and valve body. The fluid will then flow radially inwardly through the openings in the outer cage and will move the valve member radially inwardly toward conforming engagement with the convoluted inner cage. As shown in FIG. 2, when the valve member is in its dotted line, valve open, position flow passages are provided between the cylindrical inner surface of the outer cage and the valve member. These passages open outwardly of the right end of the cages 16 and 17, as viewed in FIG. 1, thus permitting the fluid to flow out of the outlet opening.

In accordance with another aspect of this invention, the flow passages formed between the outer cage and valve member, when the valve member is in a dotted line open position shown in FIG. 2, will have a total cross sectional area approximately equal to the total area of the openings in the outer cage wall. When forward flow ceases through the valve and the flow begins to reverse, liquid will enter the outlet opening into the interior of the inner cage and flow outwardly through the openings in the inner cage wall. The reverse flowing fluid will thus move the valve member 21 into conforming engagement with the cylindrical inner surface of the outer cage in which position the valve member will cover and seal the openings in the inner cage in the outer cage wall and prevent back flow through the valve. In this connection, it is preferred that the valve member be stretched slightly as it is moved into conforming engagement with the inner cage so that upon cessation of forward flow, the valve member will tend to spring back toward its closed or full line position shown in FIG. 2. This will effectively minimize water hammer. It can be seen that even with a high back pressure on the valve, there will be no reverse flow through the valve inasmuch as this pressure will merely tend to seat the valve member more firmly on the inner cylindrical surface of the outer cage so as more effectively to seal the openings in the outer cage.

As described above, the valve of this invention is particularly suited for use as a reverse check valve for handling large flow rates of water which is being pumped to great heights for example, 600 feet or more. On the other hand, the valve of this invention may find utility in other environments and with liquids other than water. In this connection, the material from which the valve member is fabricated may be any deformable material which is suitable for use with the liquid with which the valve is intended for use; for instance, when using the valve for the control of the flow of an oil, the valve member could be fabricated from neoprene rather than gum rubber. When corrosive liquids are being handled, the metal parts of the valve could be fabricated from stainless steel or other suitable material and neoprene or a suitable plastic material could be used for the valve member.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

Having thus described my invention, I claim:

1. In a fluid check valve, a valve body having an inlet and an outlet, and means for permitting fluid flow through the valve in one direction and precluding flow through the valve in the other direction including a pair of elongated hollow perforated members disposed one within the other, the perforations in one member forming a portion of the flow path through the valve in said one direction, the side of the other of said members remote from said one member being in flow communication with said outlet, and a deformable imperforate member disposed between the perforated portions of said members, the imperforate member and the one member defining a portion of the flow path through the valve, said deformable member being movable in a direction laterally of said members by fluid flow through said perforations and being engageable with said one member in a closed valve position to seal the perforations in said one member, and being engageable with said other member in an opened valve position to seal the perforations in said other member, the surfaces of said perforated members engageable by said valve member characterized by having circumferences of approximately equal dimensions.

2. A check valve comprising a valve body having an inlet and an outlet, a hollow perforated member disposed within the valve body and forming with the valve body a flow passage communicating at one end with said inlet, a second hollow perforated member disposed within the first perforated member and at least in part spaced inwardly therefrom, said second perforated member having one end which is open and in flow communication with said outlet and a deformable valve member disposed between the perforated portions of the first and second perforated members, the imperforate valve member and the first perforated member defining a portion of the flow path through the check valve, said valve member capable of being deformably movable by fluid flow through the openings in said first and second perforated members respectively out of and into conforming and sealing engagement with the inner and outer surface of said first and second perforated members respectively, said valve member when in conforming engagement with said first perforated member overlying and sealing the perforations therein to prevent back flow through the valve.

3. In a check valve comprising a valve body having an inlet and outlet, an outer hollow perforated member disposed within the valve body and forming with the valve body a flow passage communicating at one end with said inlet, an inner hollow perforated member disposed within the outer perforated member and at least in part spaced inwardly from said outer perforate member, said inner member having one end which is open and in flow communication with said outlet and a deformable valve member disposed between the perforate portions of said inner and outer members and extending circumferentially of said inner member and coextensively with the perforate portions in said inner and outer members, the perforate portions of said inner and outer members extending generally parallel to each other with the perforate portion of said inner member having a dimension circumferentially of the axis of said inner member which is at least approximately equal to the corresponding dimension of the next adjacent surface of the outer member, the deformable portion of said valve member overlying the holes in said inner and outer members having a circumferential dimension which is substantially equal to the corresponding dimension of the next adjacent surfaces of said inner and outer members.

4. A fluid check valve comprising a valve body defining an inlet, an outlet, and a flow chamber therebetween, an outer cage having an elongated hollow perforated cylindrical portion disposed within said body and in cooperation with said body forming a flow passage communicating at one end with said inlet, a hollow inner cage disposed within said hollow cylindrical portion, said inner cage having an elongated perforated convoluted surface extending parallel and next adjacent to said cylindrical portion of said outer cage, the interior of said inner cage communicating with said outlet, and a deformable membrane of generally columnar shape mounted for movement in response to change in differential pressure across the valve between first and second positions overlying the perforated surfaces of the inner and outer cages respectively.

5. A fluid check valve comprising a valve body defining an inlet, an outlet, and a flow chamber therebetween, an outer cage defining with the valve body a flow passage communicating at one end with said inlet, said outer cage having a hollow perforate cylindrical portion disposed in coaxial alignment with said chamber, an inner cage disposed within said hollow cylindrical portion in spaced relation thereto, said inner cage having a perforated convoluted surface extending parallel and adjacent to said cylindrical surface of said outer cage, and a deformable membrane disposed between said cylindrical and convoluted surfaces, said membrane assuming the contour of said cylindrical surface in the absence of a positive fluid pressure differential between said inlet and outlet and assuming the contour of said convoluted surface under the influence of a positive fluid pressure differential between said inlet and outlet.

6. A fluid check valve comprising a valve body defining an inlet, an outlet, and a flow chamber therebetween, an outer cage having a hollow perforate portion disposed within said body in spaced relation thereto, said outer cage in cooperation with said body providing a flow path from said inlet between said cage and body and through the perforations of the cage, an inner cage disposed within said hollow portion, said inner cage having a convoluted perforated surface extending parallel and adjacent to said cylindrical surface of said outer cage, the interior of said inner cage being in flow communication with said outlet, and a deformable membrane having a generally cylindrical shape disposed between the cages and having a deformable portion which conforms to the perforated inner surface of said outer cage when said membrane is in a relaxed condition and which is conformable to the perforated convoluted surface of said inner cage, said inner and outer cages being rigidly joined to one another with a portion of said membrane being clamped therebetween, the inner circumference of the perforated portion of said outer cage corresponding approximately to the outer perimeter of the convoluted perforated portion of said inner cage.

7. A fluid check valve comprising a valve body defining an inlet, an outlet, and a cylindrical flow chamber therebetween, a perforate outer cage of generally cylindrical configuration disposed concentrically within said chamber in radially inwardly spaced relation, said outer cage being provided with a closure at its end facing the valve inlet, means adjacent the other end of said outer cage forming a flow barrier between the inlet and outlet of said valve and compelling fluid flow by way of the perforations in said outer cage, a perforate inner cage disposed within said outer cage, said inner cage being convoluted and extending parallel to and adjacent to the cylindrical surface of said outer cage, and a deformable valve member having a generally cylindrical shape and conforming to the inner wall of said outer cage to seal the perforations therein, the inner circumference of said outer cage corresponding approximately to the outer perimeter of said inner cage.

8. A fluid check valve comprising a valve body defining an inlet, an outlet, and a flow chamber therebetween, an outer cage disposed within said body and having a hollow perforate cylindrical portion disposed in radially inwardly spaced relation to said body to provide a flow path communicating at one end with said inlet, an inner cage disposed within said hollow cylindrical portion, said inner cage being shaped in the form of a hollow perforated column provided with a continuous series of lobes extending parallel and adjacent to the cylindrical surface of said outer cage, and a deformable membrane having a generally cylindrical shape disposed between the cages and dimensioned to conform to the inner wall of said outer cage and to the outer wall of said inner cage when said membrane is substantially unstressed, said inner cage having one of its lobe portions bolted to said outer cage with a segment of said membrane being clamped therebetween.

9. A fluid check valve comprising a valve body defining an inlet, an outlet, and a cylindrical flow chamber therebetween, a perforate outer cage of generally cylindrical configuration disposed concentrically within said chamber in radially inwardly spaced relation to said valve body, said outer cage being provided with a closure at its end facing the valve inlet, means providing a seal between the other end of the outer cage and the body, a perforate inner cage disposed within said outer cage, said inner cage being shaped in the form of a hollow column provided with a series of flutes and lobes extending in parallel radially spaced relation to the interior surface of said outer cage, and a deformable valve member having a generally cylindrical shape conformable to the interior of said outer cage and to the exterior of said inner cage, said inner cage being mounted on said outer cage within a segment of said membrane clamped therebetween, the inner circumference of said outer cage corresponding approximately to the outer perimeter of said inner cage, the valve member being substantially unstressed when in conforming engagement with the outer cage.

10. A check valve as defined in claim 1 wherein said first hollow perforated member is characterized by having the total area of the perforations larger than the cross-sectional area of either of the valve body inlet and outlet areas.

11. A check valve as defined in claim 1 wherein said first hollow perforated member is characterized by having a total cross-sectional area of perforation approximately equal to the total cross-sectional area of the fluid flow passage between the first and second members.

12. A check valve as defined in claim 1 wherein said valve member is in a slightly stretched condition when in conforming engagement with the second perforated member.

References Cited in the file of this patent

UNITED STATES PATENTS

| 2,662,485 | Ifrey | Dec. 15, 1953 |
| 2,663,309 | Filliung | Dec. 22, 1953 |
| 2,766,765 | Bolanowski | Oct. 16, 1956 |
| 3,037,522 | Millan | June 5, 1962 |

FOREIGN PATENTS

| 1,746 | Great Britain | of 1854 |
| 219,393 | Great Britain | July 25, 1924 |